INVENTORS.
Arnold M. Spielberg
& Donald W. Evans
BY Morris [signature]
ATTORNEY.

INVENTORS.
Arnold M. Spielberg
& Donald W. Evans
BY Morris [signature]
ATTORNEY.

Aug. 30, 1960 A. M. SPIELBERG ET AL 2,951,234

STORAGE INTERROGATION SYSTEM

Filed Oct. 31, 1956 7 Sheets-Sheet 3

INVENTORS.
Arnold M. Spielberg
& Donald W. Evans
BY Morris Rabkin
ATTORNEY.

INVENTORS.
Arnold M. Spielberg
& Donald W. Evans
BY Morris L. Rabkin
ATTORNEY.

Aug. 30, 1960 A. M. SPIELBERG ET AL 2,951,234

STORAGE INTERROGATION SYSTEM

Filed Oct. 31, 1956 7 Sheets-Sheet 5

INVENTORS.
Arnold M. Spielberg
& Donald W. Evans

BY Morris Rabkin

ATTORNEY.

Aug. 30, 1960 A. M. SPIELBERG ET AL 2,951,234

STORAGE INTERROGATION SYSTEM

Filed Oct. 31, 1956 7 Sheets-Sheet 6

INVENTORS.
Arnold M. Spielberg
& Donald W. Evans
BY Morris B. Rabkin
ATTORNEY.

STORAGE INTERROGATION SYSTEM

Filed Oct. 31, 1956 7 Sheets-Sheet 7

INVENTORS.
Arnold M. Spielberg
& Donald W. Evans
BY
ATTORNEY.

United States Patent Office 2,951,234

Patented Aug. 30, 1960

2,951,234

STORAGE INTERROGATION SYSTEM

Arnold M. Spielberg, Haddonfield, N.J., and Donald W. Evans, Grand Rapids, Mich., assignors to Radio Corporation of America, a corporation of Delaware Filed Oct. 31, 1956, Ser. No. 619,605

9 Claims. (Cl. 340—172.5)

This invention relates to information handling systems, and particularly to a system for efficiently interconnecting an information storage and electronic sorters.

In many high speed data processing systems, a large volume of information is placed in storage. The storage may include several different storage units, such as different magnetic tape units, each of which includes its individual magnetic tape on which information may be stored. A special purpose electronic data processing machine or sorter may be employed for extracting selected information from these tapes and for merging, sorting, and collating the information on the tapes. For example, such sorters are described in the copending applications, Serial No. 427,167, entitled "Sorting Apparatus," filed May 3, 1954, by Howard P. Guerber, and Serial No. 440,646, entitled "Information Handling System," filed July 1, 1954, by William R. Ayres and Joel N. Smith, both assigned to the assignee of the present invention. However, a general purpose computer may be programmed to perform one or more of the functions of a suitable sorter, and when employed for such a function is intended to be included in the term "sorter."

In a copending application, Serial No. 457,719, now U.S. Pat. No. 2,885,659, filed September 22, 1954, by A. M. Spielberg, entitled "Electronic Library System," assigned to the assignee of the present invention, a system is described for efficiently connecting a sorter to one of several tape units for operation with respect to information coded in alpha-numeric form in a particular one of the units. Each individual message contains a key segment, the criterion, which determines the proper order sequence of the message. The messages are ordered in sequence on the tapes. An index consisting of the criterion from the first message of each tape is prepared. In the system described in the said Spielberg application, a criterion is entered into the sorter. The sorter then locates the tape having the message or messages corresponding to the criterion and further searches the tape thus located to find the desired message for performing an operation. It is desirable, sometimes, to employ a plurality of sorters with several tape files.

Accordingly, it is an object of this invention to provide an improved system for interrogating a storage.

Another object of the invention is to provide an improved system for access to stored information which permits several interrogations to proceed at one time.

A further object of the invention is to provide an improved system for interconnecting cooperating sorters and tape files for the efficient use of the equipment.

A further object of the invention is to provide an improved system for preparing the index to an information storage system.

A still further object of the invention is to provide an improved system for locating information stored on magnetic tapes.

It is another object of the invention to provide apparatus for several sorters to operate with several tape units in a rapid and orderly fashion, where any sorter may have access to any tape unit.

In accordance with the present invention, several sorters are addressed successively in response to successive counts in a counter. A "free" signal from any addressed sorter indicates availability and disables the sorter counter. The interrogation system then compares the criterion in the sorter with an index of criteria, stored preferably on a magnetic drum, to determine which tape unit contains a message corresponding to the criterion.

The code address of the desired tape unit is sent to a switching center which then connects the corresponding tape unit to the available sorter. The sorter then generates a "busy" signal which enables the counting means. The successive addressing of sorters is resumed until the counter is again disabled by a "free" signal from an available sorter.

If a tape unit is required for connection to a first sorter and is found "busy" with a second sorter, the switching center signals the first sorter and a "tape busy" signal is generated, enabling the counter. The first sorter remains unused until the counter again addresses it.

When a sorter locates a message corresponding to the criterion and completes the required operation, the next criterion in the sorter is located or entered in the sorter. The sorter then waits until again addressed by the counter and the new criterion is compared with the index. If the comparison result indicates that the same tape unit should remain connected to the same sorter, the sorter and tape unit remain connected, the "busy" signal is generated, and the tape is further searched. If the same tape unit does not contain the message whose criterion is in the sorter, the switching center disconnects that tape unit and connects the proper one.

In many instances, the information stored on the various tapes changes from time to time as information is added or extracted. Therefore, it may be desirable or necessary from time to time to change the index of first messages. Accordingly, another feature of the invention resides in rewriting the index of the criteria of the first messages of each tape. This feature of the invention involves the use of a single sorter to successively receive such first criteria and write them in proper order in the index in the locations corresponding to the respective tape files.

The novel features of the invention as well as the invention itself, both as to its organization and method of operation will best be understood from the following description when read in connection with the accompanying drawings. In the accompanying drawings like reference numerals refer to like parts. Reference numbers of elements of the above-mentioned Spielberg application have been applied to their counterparts in the present disclosure.

Figure 1:
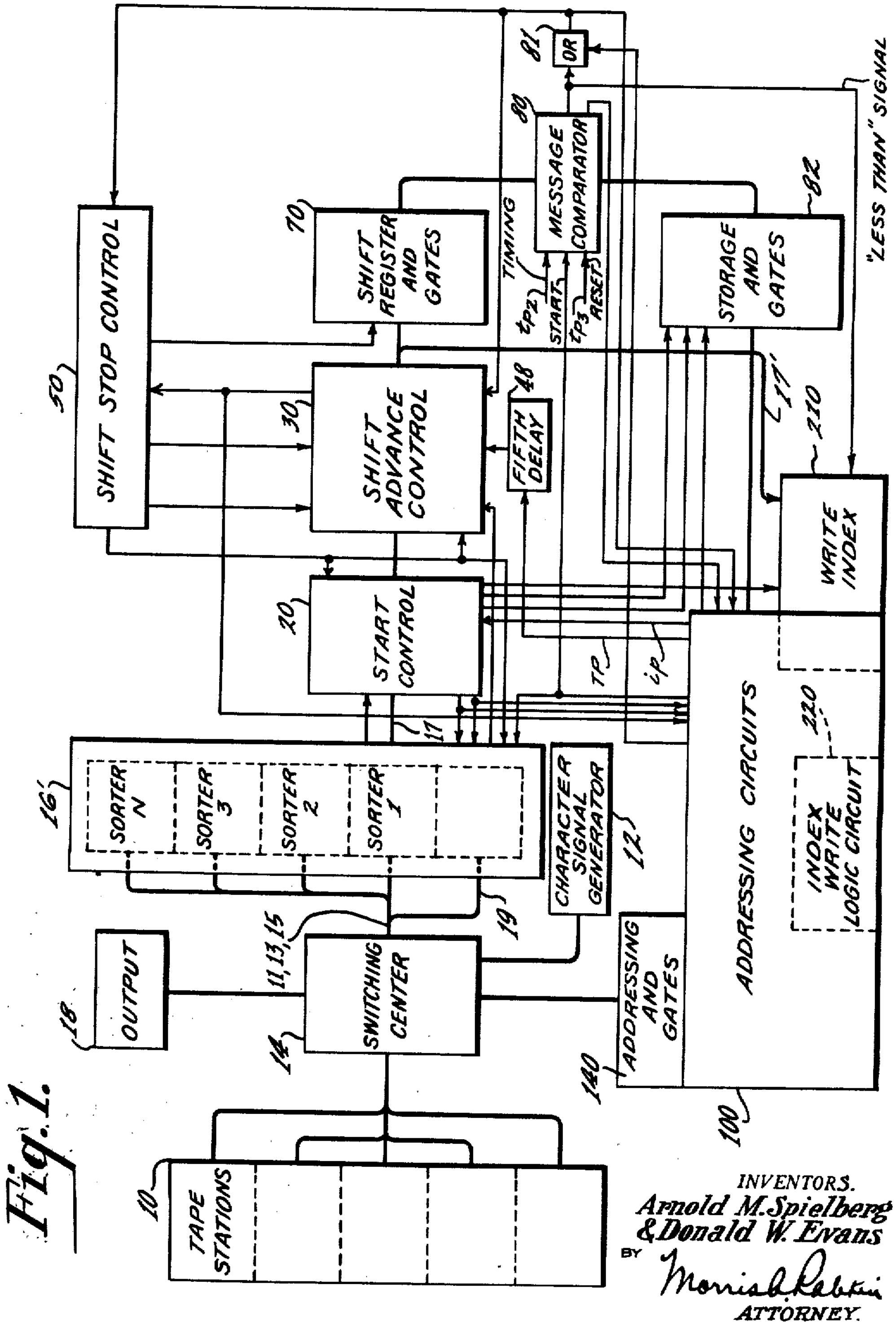
Figure 1 is a block diagram of an electronic library system according to the present invention.

The embodiment of Figure 1 is a modification of the system shown and described in the above-mentioned copending application of A. M. Spielberg, Serial No. 457,-719, entitled "Electronic Library System." Corresponding parts in the system of Figure 1 and in the Spielberg system bear like reference numerals. The present system employs several sorters, whereas in the Spielberg system, only a single sorter 16 is described.

In Figure 1, an electronic library system in block form is shown connected to a block of sorters 16', one of which is shown as a separate block 16 and any individual one is similarly designated as 16. Tape stations 10 connect to the sorters 16' through a switching center 14. An output unit 18 is provided to record the information extracted from the library tapes. A character signal generator 12, connected through the switching center 14 to the sorter 16, may provide the criterion of the message to be located and written out. Several sorters 16 are connected as more fully described hereinafter, in connection with Figure 2. Each sorter 16 has a binary address which is provided to the switching center 14 on a multiple channel input line 19 described more fully in connection with Figure 4.

With many information handling systems, tape stations 10 are used not only as units for general information storage, but also may provide search criteria. Information extracted from a tape station 10 may be written into another tape station 10. For these purposes, the switching center 14 is connected to each tape station 10 and to each sorter 16 so that one of several tape stations 10 may be connected selectively to any sorter 16. In one embodiment, four tape stations 10 (two input and two output) can be connected to each sorter 16 through the switching center 14. One of the input tapes (the List Input Tape, LIT), contains the search information and one of the output tapes, OT, records the extracted information.

The criterion information is transmitted from the sorter 16 on multi-channel line 17 through a start control unit 20 and a shift advance control unit 30 to a set of shift register "and" gates 70 which connect to a message comparator 80.

"And" or coincidence gates are well known circuit elements having one output and at least two inputs and characterized by the property of providing an output signal only in response to signals coinciding at all inputs.

From a rapid access storage within a group of addressing circuits 100, the criteria of the initial messages on each storage tape are transmitted to a set of storage "and" gates 82 which also connect to the message comparator 80. The output signals of the message comparator 80 are transmitted on separate output lines. A "Greater Than or Equal To" signal and a "Less Than" signal from the message comparator 80 are applied to an index write logic portion 220 of the addressing circuits 100. The "Less Than" signal is also applied to one input of a two-input comparator "or" circuit 81, whose second input is a signal from the index write logic portion 220 of the addressing circuits 100.

"Or" circuits are well known elements having one output and at least two inputs and are characterized by the property of providing an output signal in response to any input signal. The output of the comparator "or" circuit 81 is applied to a shift stop control unit 50 and the addressing circuits 100 where it is applied to the index write logic portion 220.

A set of addressing "and" gates 140 within the addressing circuits 100 apply a binary coded address on a multi-channel line to the switching center 14 to enable connection of the proper tape station 10 to a selected sorter 16. A stop counter flip-flop 128 also within the addressing circuits 100 (shown only in the Spielberg application) is set at the occurrence of each index pulse, *ip*, to enable the storage "and" gates 82.

The start control unit 20 applies enabling signals to the sorters 16', the addressing circuits 100, and to the storage "and" gates 82. Within the addressing circuits 100, timing signals are generated to be applied to the start control unit 20, to the shift advance control unit 30 through a fifth delaying means 48, and to the message comparator 80.

The shift stop control unit 50 applies enabling signals to the storage "and" gates 82, the shift register "and" gates 70, and to the shift advance control unit 30.

The write index portion 210 of the addressing circuits 100 receives control signals from the start control unit 20. The index write logic portion 220 of the addressing circuits 100 receives signals from both the start control unit 20 and the shift advance control unit 30. The write index portion 210 is connected to the message output of the shift control unit 30 by means of a multi-channel cable 17'.

The write index portion 210 is explained more fully below in connection with Fig. 7. The index write logic portion 220 is more fully explained in connection with Fig. 8, below.

Figure 1A:
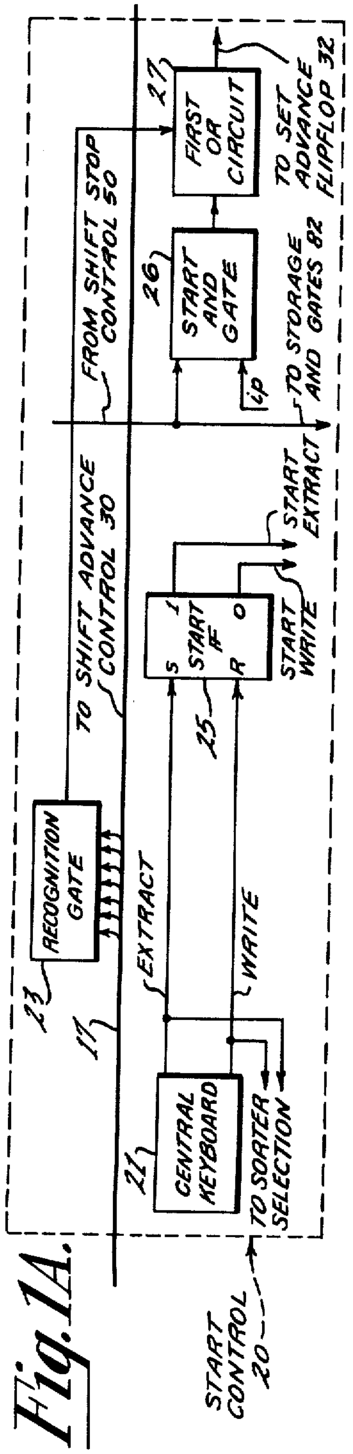
Figure 1A is a block diagram of a start control unit of Figure 1.

Figure 1A is a block diagram of the start control unit 20 of Figure 1. The start control unit 20 is similar to that shown in the above-mentioned Spielberg application with suitable modifications according to the present invention. A central keyboard 21 has "Extract" and "Write" keys (not shown) which, when actuated, provide Extract and Write signals, respectively.

The Extract signal is applied to the Sorters 16' of Fig. 1 and is also applied to the set terminal S of a start flip-flop 25. A flip-flop may be any known bistable circuit having an input and an output corresponding to each of the stable states, designated "1" and "0." One input may be designated the Set input corresponding to the 1 output and the other input may be designated the Reset input corresponding to the 0 input. The Write signal is applied to the sorters 16' and to the reset terminal R of the start flip-flop 25. The multi-channel cable 17 of Fig. 1 transmits signals representing messages from the selected sorter 16 to a recognition gate 23 in the start control unit 20 of Fig. 1A. A suitable code recognition gate is disclosed in Patent No. 2,648,-829, entitled "Code Recognition Circuit" issued to William R. Ayres and Joel N. Smith, August 11, 1953. This recognition gate detects certain signal code combinations. Recognition signals are applied from the recognition gate 23 to a first "or" circuit 27.

A two-input start "and" gate 26 is enabled by a signal from the shift stop control unit 50 of Fig. 1 and by an index pulse, *ip*, from the addressing circuit 100 of Fig. 1. The output of the start "and" gate 26 is applied to the first "or" circuit 27. The output of the first "or" circuit 27 is applied to the shift advance control unit 30, described in greater detail in connection with Fig. 1B, below.

Figure 1B:
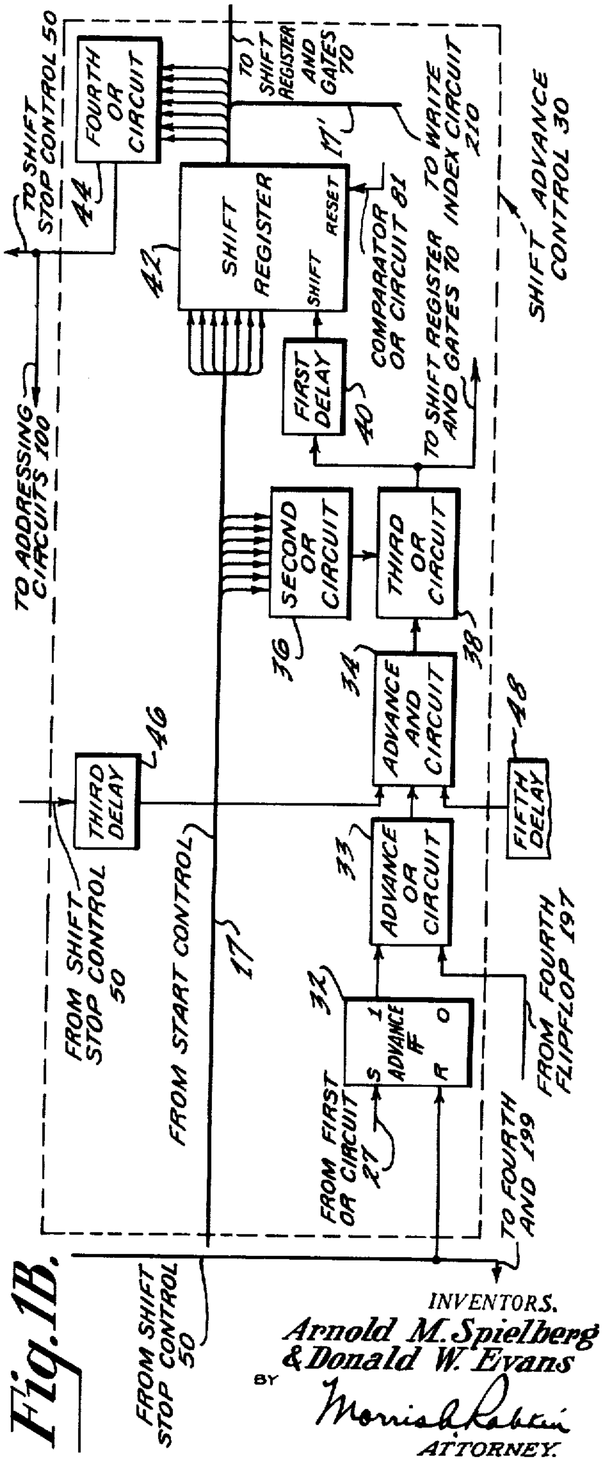
Figure 1B is a block diagram of a shift advance control unit of the system of Figure 1.

Fig. 1B is a block diagram of the shift advance control unit 30 of Fig. 1, which may be the Spielberg shift advance control unit with certain modifications. The output of the first "or" circuit 27 of Fig. 1A is applied to the set terminal S of an advance flip-flop 32 of Fig. 1B whose reset terminal R is connected to an output of the shift stop control unit 50 of Fig. 1. The "1" output of the advance flip-flop 32 of Fig. 1B is applied to a two-input advance "or" circuit 33. The sorters 16' of Fig. 1 apply a second input to the advance "or" circuit 33.

The output of the advance "or" circuit 33 is applied to one input of a three-input advance "and" gate 34, which is enabled on its other inputs by signals from the shift stop control unit 50 of Fig. 1, applied through a third delay 46, and from the addressing circuits 100, applied through a fifth delay 48. The output of the advance "and"

gate 34 is applied to a third "or" circuit 38. The multi-channel message line 17 carrying the message from the selected sorter 16 is connected to a multiple-input second "or" circuit 36 whose output is applied to the third "or" circuit 38. The multi-channel message line 17 is connected to the message signal input terminals of a shift register 42 which temporarily stores the signals making up a complete criterion.

The output of the third "or" circuit 38 is applied through a first delay 40 to the shift terminal of the shift register 42 and is also applied to the shift register "and" gates 70 of Fig. 1. A reset signal is applied to shift register 42 from the comparator "or" circuit 81 of Fig. 1 described above. The message output of the shift register 42 is applied to a fourth "or" circuit 44, to the shift register "and" gates 70 (of Fig. 1), and to the write index circuit 210 (of Fig. 1), explained more fully in connection with Fig. 7 hereinafter.

The fourth "or" circuit 44 applies signals to the shift stop circuit unit 50 and the addressing circuits 100 of Fig. 1.

Figure 2:
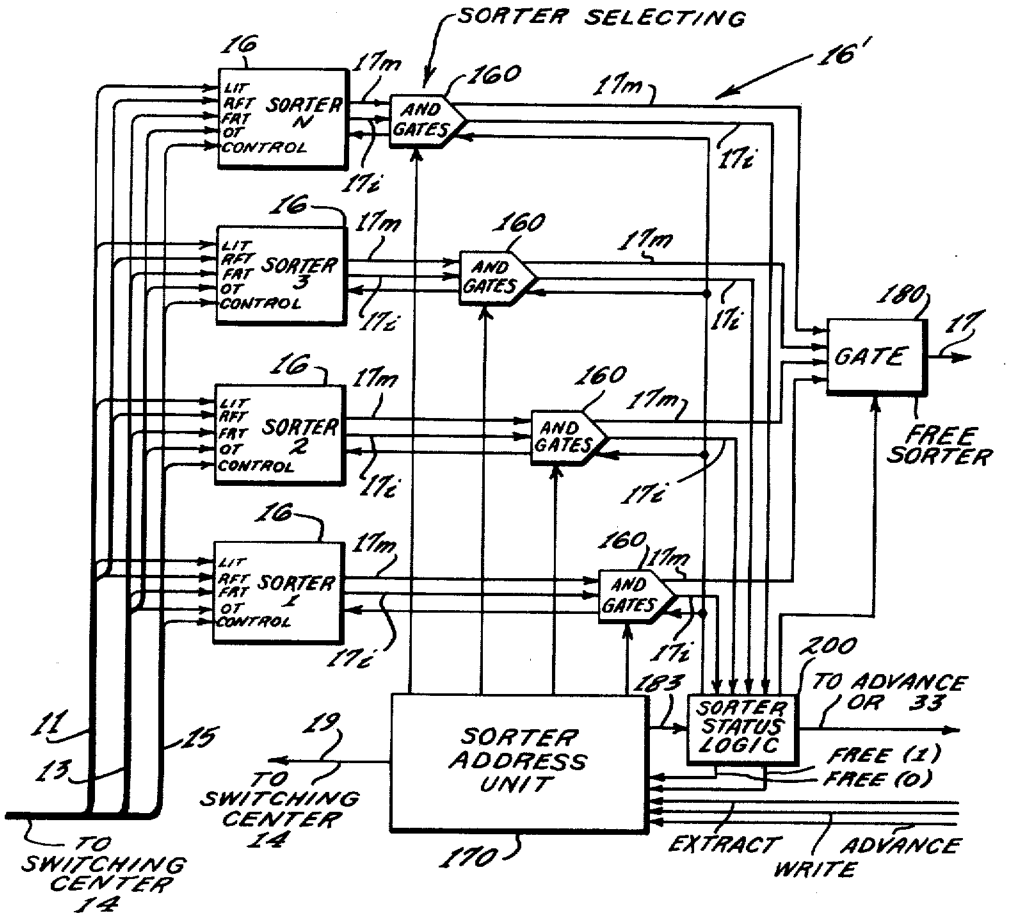
Figure 2 is a block diagram of a portion of Figure 1 showing certain connections to and from the block of sorters.

In the diagram of Fig. 2, the several sorters 16 comprising the sorters 16′ of Fig. 1 are shown. Each sorter 16 communicates with the switching center 14 on multi-channel cables. A sorter 16 connects with list input tapes, LIT, and reference file tapes, RFT, on multi-channel input line 11, and with output tapes, OT, and file residue tapes, FRT, on multi-channel output line 13. LIT signals may be supplied to the sorters 16 by any tape stations 10 containing a list of messages to be extracted, or may be the output of a character signal generator 12 of Fig. 1.

A tape station 10 receives the extracted messages from the sorters 16, or the messages may be sent to the output unit 18 of Fig. 1, which may be a typewriter. Further, the sorters 16 supply tape control signals to the various tape stations 10 on multi-channel control cable 15 through the switching center 14.

The output of each of the sorters 16 is applied to a sorter selecting "and" gate 160, to be more fully described in connection with Fig. 6, on two multi-channel lines 17*m*, 17*i*, carrying message signals and information signals, respectively. The sorter selecting "and" gate 160 is enabled by a signal from a sorter address unit 170 more fully described in connection with Fig. 5. The message signal output of the sorter selecting "and" gates 160 is applied on multi-channel line 17*m* to a "free" sorter gate 180, to be more fully described in connection with Fig. 6. The sorter status information signals from the sorter selecting "and" gate 160 are applied on multi-channel line 17*i* to a sorter status logic unit 200, described more fully in connection with Fig. 5.

The "free" sorter gate 180 is enabled by signals from the sorter status logic unit 200 and provides a multiple message signal output to the start control unit 20 over multi-channel line 17. As may be seen by reference to Figs. 1A and 1B, the multi-channel line 17 connects to the recognition gate 23 of Fig. 1A and the second "or" circuit 36 and shift register 42 in Fig. 1B.

Figure 3:
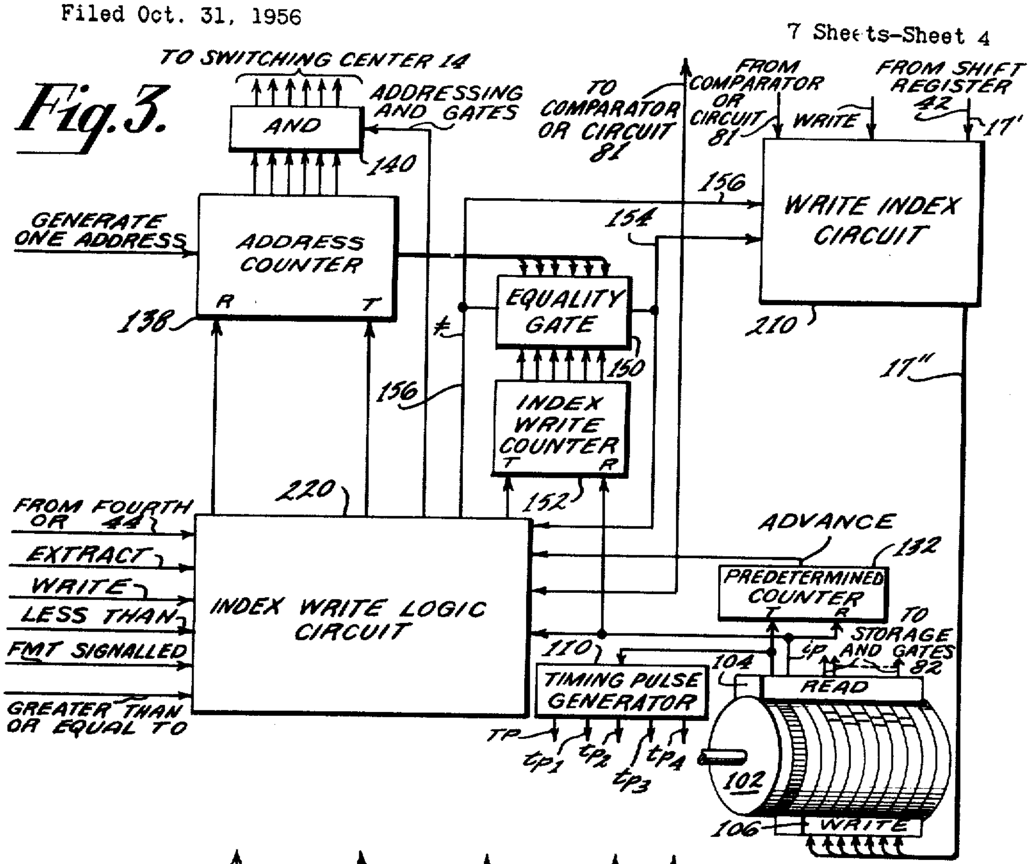
Figure 3 is a diagram of portions of the addressing circuits of Figure 1A.

In the diagram of Fig. 3, the addressing circuits 100 of Fig. 1 are set out in somewhat greater detail. A cyclical storage device, preferably a magnetic drum 102, contains information channels and timing channels including an index pulse channel. The one reference mark in the index channel gives rise to the index pulse, *ip*. The timing channel marks correspond to each storage location. Read heads 104, write heads 106, and associated amplifiers are provided to exchange signals between the sorters 16 and the magnetic drum 102.

A timing pulse generator 110 is connected to the timing track read heads in the read unit 104, and provides timing pulses, TP, and secondary pulses, *tp*1 through *tp*4. The timing track output is further applied to a predetermined counter 132 which provides a signal after receiving a number of timing pulses equivalent to the number of character spaces allotted to each criterion. The counter 132 is connected to the index write logic unit 220 to be more fully described below in connection with Fig. 8. The predetermined counter pulses are termed "advance" pulses.

The index write logic unit 220 provides triggering and reset signals to an address counter 138 which, in turn, provides a binary output to the addressing "and" gates 140 of Fig. 1 and to an equality gate 150. One particular address may be generated by means of a separate input for that purpose.

Figure 7:
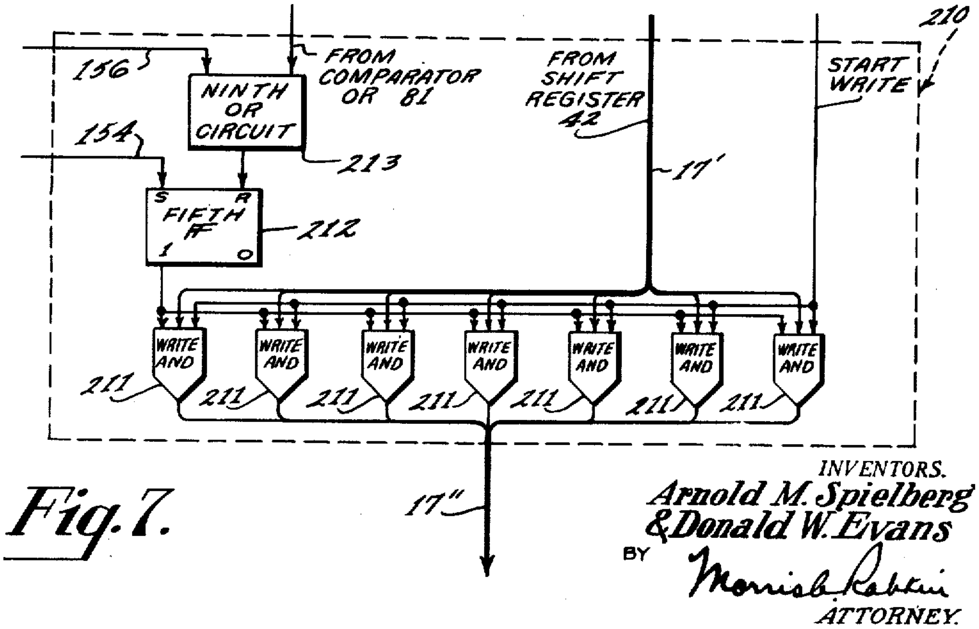
Figure 7 is a detailed diagram of a write index circuit of Figure 3.
Figure 8:
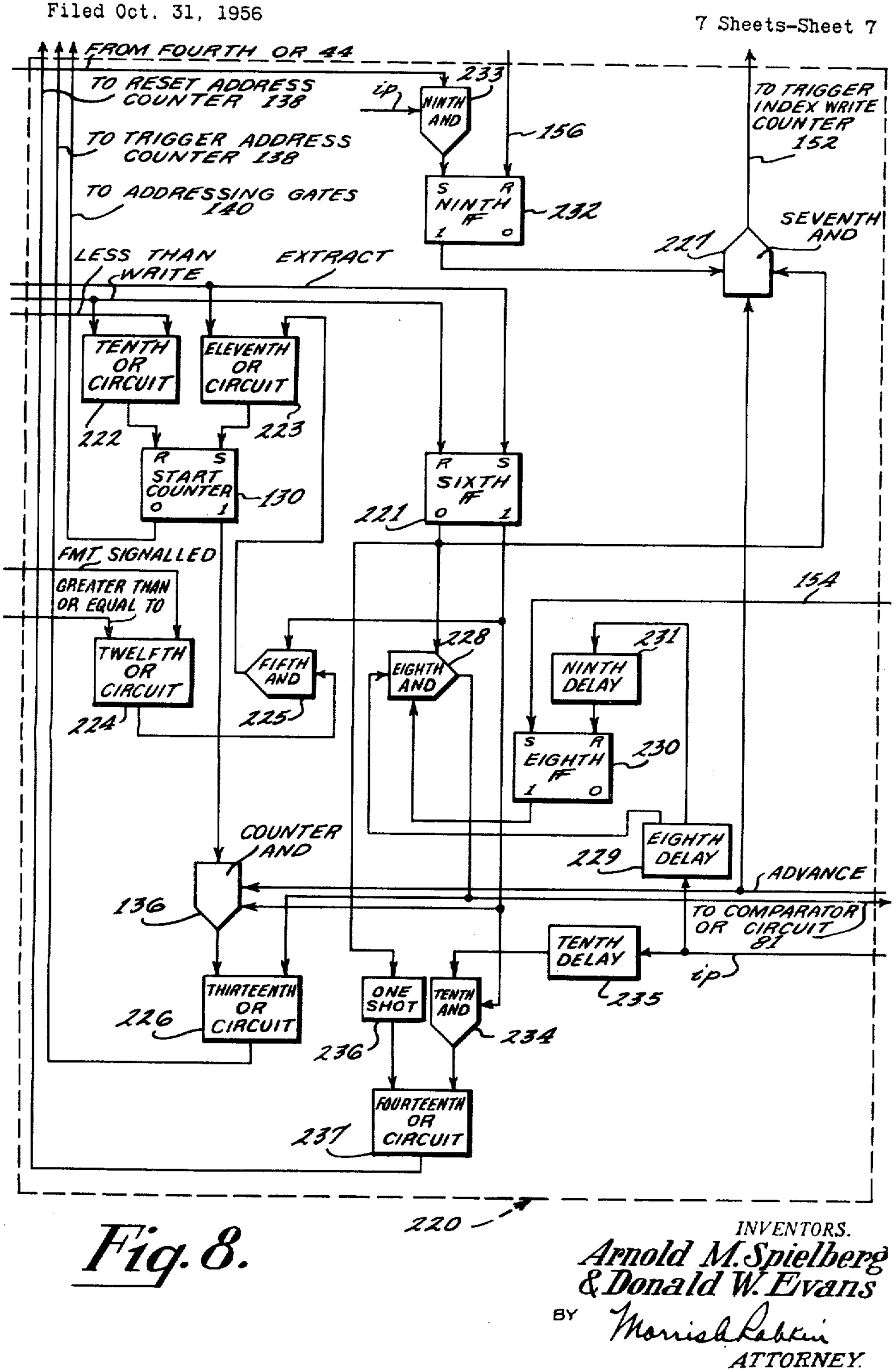
Figure 8 is a detailed diagram of an index write logic unit of Figure 3.

The addressing "and" gates 140 are enabled by an output of the index write logic unit 220 explained more fully in connection with Fig. 8. The index write logic unit 220 also applies signals to a write index circuit 210, to be explained more fully in connection with Fig. 7 and triggering pulses to an index write counter 152. The index-pulse read heads of the read circuits 104 apply reset signals to the index write counter 152. The index write logic unit 220 receives enabling signals from other elements of the system, more fully explained below.

The binary count output of the address counter 138 is compared in the equality gate 150 with the binary count signals of the index write counter 152. Signals of equality are produced on output line 154 and inequality signals are produced on output line 156. Both equality and inequality signals are applied to the write index circuit 210 and the index write logic unit 220.

The write index circuit 210 receives information from the shift register 42 of Fig. 1B on multi-channel line 17′ and transfers the signals to the drum write circuit 106 on multi-channel cable 17″. Control signals are received from the start flip-flop 25 of Fig. 1A and the message comparator "or" circuit 81 of Fig. 1.

Figure 4:
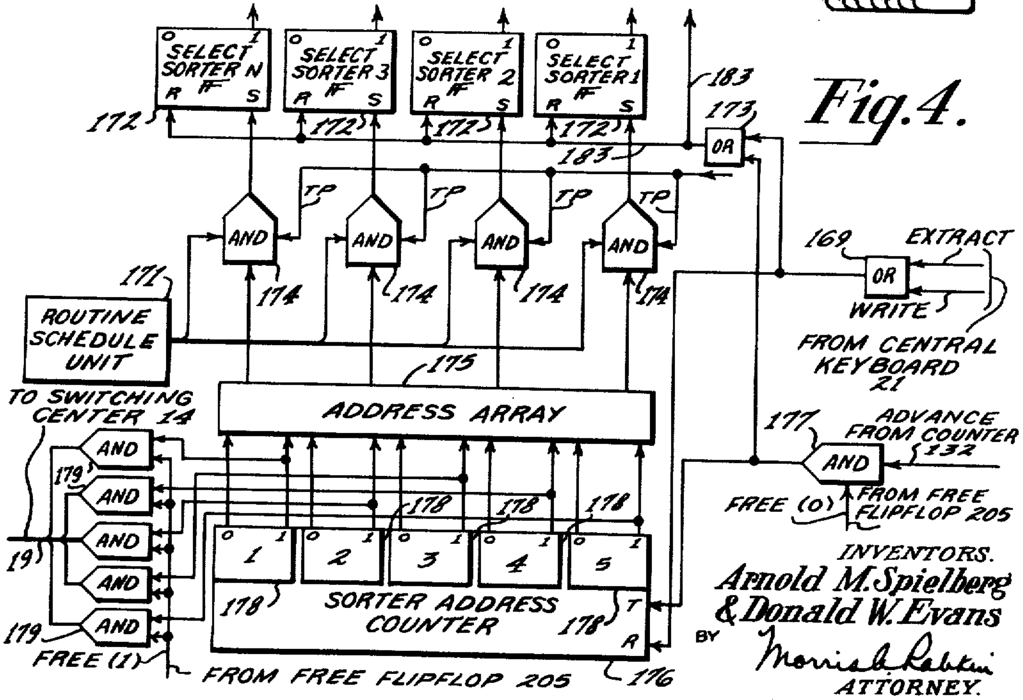
Figure 4 is a diagram of a sorter address circuit suitable for use in the circuits of Figure 2.

In the circuits of Fig. 4, a manual keyboard (not shown) or other signal source may serve as a routine schedule unit 171, which provides binary address signals on multiple lines to program the routine selection of sorters 16. A routine schedule unit 171 may also be programmed automatically from a "scheduling" input tape through the switching center 14.

The sorter 16, whose corresponding sorter selector "and" gate 160 of Fig. 2 is enabled by the output of an associated sorter selecting flip-flop 172, can transmit its criterion into the system. The sorter selecting flip-flops 172 are reset at the terminal R by a signal from the selector reset "or" circuit 173 and are set at the terminal S by the output of sorter address "and" gates 174, which are enabled by the routine schedule unit 171, a sorter address array 175, and the timing pulse generator 110.

The sorter address array 175 may be any known addressing matrix which energizes a different output line for each combination of several inputs. The sorter address array 175 receives input signals from a sorter address counter 176 which is triggered by the output of a "free" advance "and" gate 177. The "free" advance gate 177 is enabled by a signal from a "free" flip-flop 205 (more fully explained in connection with Fig. 5) and by and "advance" pulse from the predetermined counter 132.

The sorter address counter 176 is reset by a signal from a counter reset "or" circuit 169 whose input comes from the central keyboard 21 of Fig. 1A, signalling that information is to be extracted from the system, Extract, or a new index is to be written, Write. The output of the counter reset "or" circuit 169 is applied to the reset terminal, R, of the sorter address counter 176 and to the selector reset "or" circuit 173. The output of the "free" advance gate 177 is also applied to the input of the reset "or" circuit 173 whose output is transmitted to other elements of the system on signal line 183.

The sorter address counter 176 is a combination of several interconnected flip-flops 178 whose outputs provide a binary signal output to the sorter address array 175 and to a bank of sorter addressing "and" gates 179. The set output of the "free" flip-flop 205 enables the sorter addressing "and" gate 179 which provides a binary sorter address to the switching center 14 of Fig. 1 on the multichannel line 19.

Figure 5:
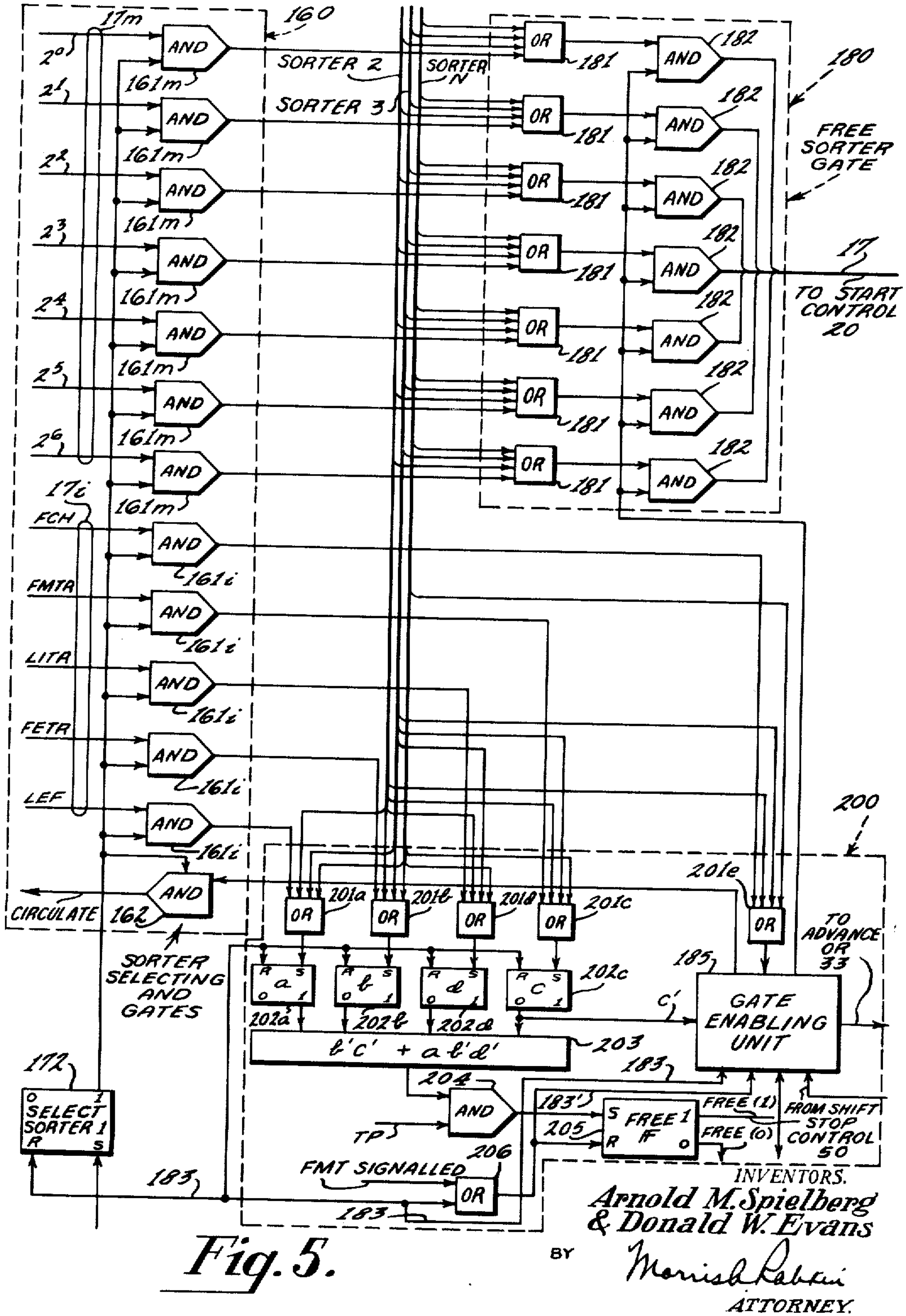
Figure 5 is a diagram in greater detail of certain sorter selection elements of Figure 2.

In Fig. 5, the circuit elements which select a particular sorter 16 to send its message into the system are shown in diagram form. Each sorter 16 provides signals on separate lines 17*m*, 17*i* to a corresponding selecting "and" gate 160. The sorter selecting "and" gate 160 may be represented by a plurality of individual, two-input, sorter selecting "and" gates 161*m*, 161*i* each connected to a separate input channel, and all enabled by the corresponding sorter selecting flip-flop 172.

The output of each of the sorter selecting "and" gates 161*m* connected to the message lines 17*m* is applied to an "N"-input message "or" circuit 181, each input being connected to similar outputs of each of the "N" sorters 16. The outputs of each of the message "or" circuits 181 are applied to separate two-input message "and" gates 182, each of which is enabled by a signal from a gate enabling unit 185, which also provides a "circulate" signal to the enabled sorter through a two-input sorter selecting "and" gate 162.

The gate enabling unit 185 is more fully described in connection with Fig. 6. A test circuit including separate "N"-input, logic "or" circuits 201*a*—201*e* connects with the output of each of the remaining selecting "and" gates 161*i*, which transmit the sorter status information signals. In the test circuit, one of the logic "or" circuits, 201*e*, is connected to a first character "and" gate 187 within the below-described gate enabling unit 185.

The output of each of the other logic "or" circuits 201*a*—201*d*, is applied to the set terminal S of a different logic flip-flop, 202*a*—202*d*. The logic flip-flops 202*a*—202*d* are reset by a signal to their respective reset terminals, R, from the selector reset "or" circuit 173, applied on signal line 183.

Certain operating conditions within the sorters 16 give rise to signals in various channels of the line 17*i* connected to corresponding sorter selecting "and" gates, 161*i*. Sorters or data processing machines generally may be easily arranged to generate signals indicative of: (1) File Message Tape Running, FMTR, which is applied to the set terminal S of the "*c*" logic flip-flop 202*c*; (2) List Input Tape Running, LITR, applied to the set terminal S of the "*d*" logic flip-flop 202*d*; (3) File Extract Tape Running, FETR, applied to the set terminal S of the "*b*" logic flip-flop 202*b*; and (4) List Equals File, LEF, indicating that the criterion of a message on the file tape matches the criterion in the sorter register, applied to the set terminal S of the "*a*" logic flip-flop 202*a*.

The outputs of the *a, b, c, d*, logic flip-flops 202*a*—202*d* are combined in a logic block unit 203, which represents the Boolean equation, $b'c'+ab'd'$. A primed letter represents the negative of a quantity and may be the (0) or reset output of a flip-flop. Any known logic network may be used to represent this Boolean equation, which symbolizes the relationship: "Either the file extract tape and the file memory tape are both not running, or, a file message equals a list message, the file extract tape is not running, and the list input tape is not running." In either event, the addressed sorter 16 may be considered as "free," and, therefore, ready to look for a new message.

The output of the logic block unit 203 is applied to one input of a two-input logic "and" gate 204 which is enabled at its second input by a timing pulse, TP. The output of the logic "and" gate 204 is applied to set the free flip-flop 205 which provides free (1) and free (0) signals to the system. The free flip-flop 205 is reset by the output of a two-input "or" circuit 206 whose inputs connect to the signal line 183 and the switching center 14. The signal from the switching center 14 indicates that the address of a file memory tape has been placed in the switching center 14 for connection to the sorter 16, FMT signalled.

The output of the "or" circuit 206 is applied to signal line 183' which connects to circuit elements of Fig. 6 in a manner to be described below.

The *c'* output of the "*c*" logic flip-flop 202*c*, indicating that a file memory tape is not running, is applied to the gate enabling unit 185, as is the free (1) output of the "free" flip-flop 205. The gate enabling unit 185 provides a "circulate" signal to the internal storage registers (not shown) of the sorters 16.

Figure 6:
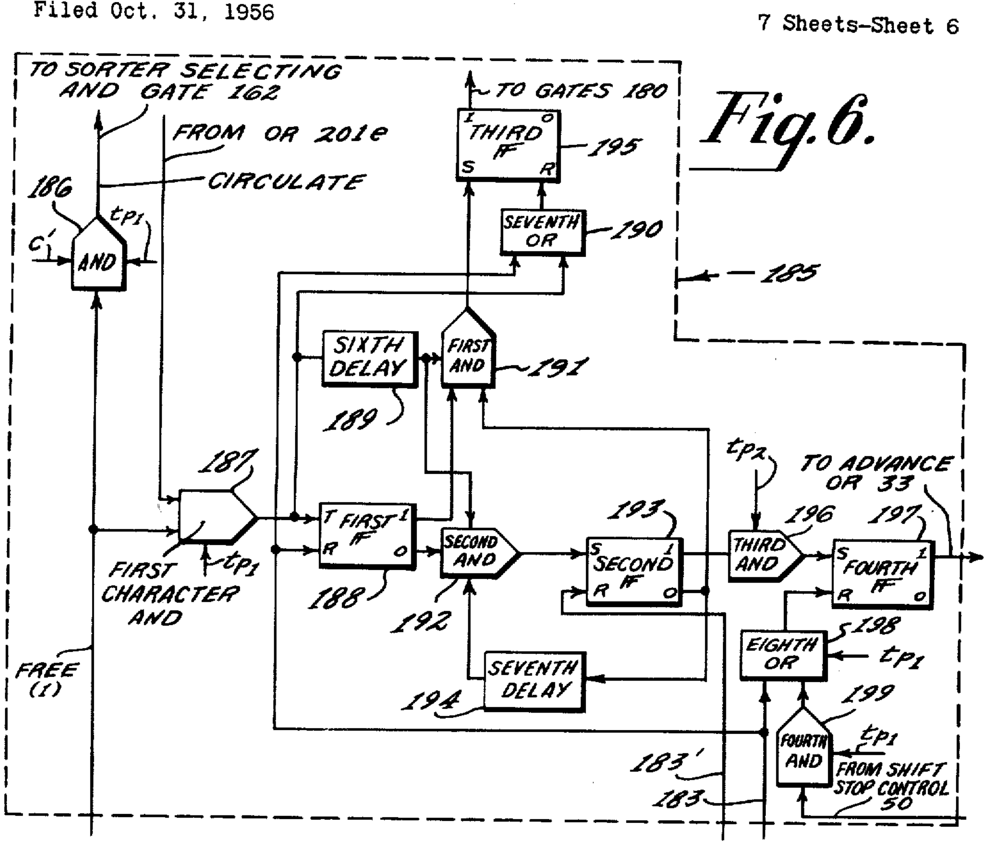
Figure 6 is a detailed diagram of a gate enabling unit of Figure 5.

In Figure 6, a gate enabling unit 185, suitable for use in the present invention and indicated as a block in Fig. 5, is set out in greater detail.

The *c'* output of the "*c*" logic flip-flop 202*c* is applied to one input of a three-input circulate "and" gate 186. A second input is applied from the free (1) output of the "free" flip-flop 205 and a timing pulse, *tp*1, provides the third enabling input.

The output of the circulate "and" gate 186 is applied to the sorters 16 through the enabled sorter selecting "and" gate 162. The internal sorter register (not shown) then circulates its contents, the criterion of the message sought.

The free (1) output of the 'free" flip-flop 205 is also applied to a three-input first character "and" gate 187 which is further enabled by the signal output of the logic "or" circuit 201*e* signalling that the first character signal of the criterion has been circulated to the output terminal of the internal register of the sorter 16. The third input to the first character "and" gate 187 is a timing pulse, *tp*1.

The output of the first character "and" gate 187 is applied to the trigger T of a triggerable, first flip-flop 188. A triggerable flip-flop is a bistable multivibrator circuit having two input terminals and two output terminals corresponding respectively to the stable states termed "1" and "0," respectively. Successive input signals on the trigger terminal causes the circuit to assume alternately each of the two stable states, resulting in alternate energization of each of the output terminals. The output of the first character "and" gate 187 is also applied to a sixth delaying means 189 and one input of a two-input seventh "or" circuit 190. The signal line 183 of Fig. 4 is connected to the second input of the seventh "or" circuit 190, and to the reset terminal R of the first flip-flop 188.

The (1) output of the first flip-flop 188 is applied to one input of a three-input first "and" gate 191. The output of the sixth delaying means 189 also is applied to one input of the first "and" gate 191. The (0) output of the first flop-flop 188 is applied to a three-input second "and" gate 192, which is further enabled by the output of the sixth delaying means 189 and (0) output of a second flip-flop 193 applied through a seventh delaying means 194. The signal lines 183' of Fig. 5 is connected to the reset terminal R of the second flip-flop 193.

The (0) output of the second flip-flop 193 is also applied to a third input of the first "and" gate 191. The (1) output of the second flip-flop 193 is applied to a two-input third "and" gate 196 which is enable on its second input by a timing pulse *tp*2.

The output of the first "and" gate 191 is applied to the set terminal S of a third flip-flop 195 whose (1) output enables the "free" sorter gate 180. The third flip-flop 195 is reset by the output of the seventh "or" circuit 190.

The output of the third "and" gate 196 is applied to the set terminal S of a fourth flip-flop 197. The fourth flip-flop 197 is reset by the output of a two-input eighth "or" circuit 198, the inputs of which are connected to the signal line 183 and to the output of a two-input fourth "and" gate 199. The fourth "and" gate 199 is enabled by the (1) output of a stop flip-flop (not shown) within the shift stop control unit 50 of Fig. 1, and a timing pulse, *tp*1. The (1) output of the fourth flip-flop 197 is connected to one input of the advance "or" circuit 33 of Fig. 1B.

Fig. 7 is a detailed diagram of a write index circuit 210 suitable for use in the circuits of Figs. 1 and 3.

Information character signals are transmitted on multi-channel line 17′ from the shift register 42 of Fig. 1B to a set of three-input write "and" gates 211, each gate corresponding to an information channel. Enabling signals are applied to the write "and" gates 211 by the Start Write output of the start flip-flop 25 of Fig. 1A and by the (1) output of a fifth flip-flop 212.

The set terminal S of the fifth flip-flop 212 is connected to the equality output line 154 of the equality gate 150 of Fig. 3 and the reset terminal R is connected to the output of a ninth "or" circuit 213. The non-equal output line 156 of the equality gate 150 connects to one input of the ninth "or" circuit 213, the other input of which is connected to the output of the comparator "or" circuit 81 of Fig. 1.

The output of the write "and" gates 211 is applied to the drum write heads 106 of Fig. 3 on multi-channel cable 17″.

In Figure 8, a diagram of an index write logic unit 220 is shown, suitable for use in the circuits of Figs. 1 and 3. The index write logic unit 220 receives the Extract output of the central keyboard 21 of Fig. 1A, which is applied to the set terminal S of a sixth flip-flop 221, and to one input of a two-input eleventh "or" circuit 223. The Write output of the central keyboard 21 is applied both to the reset terminal R of the sixth flip-flop 221, and one input of a two-input tenth "or" circuit 222.

The signal from the switching center 14 indicating that the File Memory Tape is signalled, FMT signalled, is applied to one input of a two-input twelfth "or" circuit 224 which receives its second input from the "Greater Than or Equal To" output of the message comparator 80 of Fig. 1. The output of the twelfth "or" circuit 224 and the (1) output of the sixth flip-flop 221 are each applied to one input of a two-input fifth "and" gate 225. The output of the fifth "and" gate 225 is applied to the second input of the eleventh "or" circuit 223. The second input of the tenth "or" circuit 222 is connected to the output of the "Less Than" terminal of the message comparator 80.

The output of the eleventh "or" circuit 223 is applied to the set terminal S of a start counter flip-flop 130. The output of the tenth "or" circuit 222 is applied to the reset terminal R of the start counter flip-flop 130. The (0) output of the start counter flip-flop 130 is applied to the addressing "and" gates 140 of Figs. 1 and 3, and the (1) output is applied to one input of a three-input counter "and" gate 136. The (1) output of the sixth flip-flop 221 and an "advance" pulse from the predetermined counter 132 of Fig. 3 are applied respectively to the second and third input terminals of the counter "and" gate 136. The output of the counter "and" gate 136 is applied to a two-input thirteenth "or" circuit 226.

The (0) output of the sixth flip-flop 221 is applied both to a three-input seventh "and" gate 227 and to a three-input eighth "and" gate 228. A second input to the eighth "and" gate 228 is connected to the output of an eighth delaying means 229 to which is applied an index pulse, *ip*. The third input to the eighth "and" gate 228 is connected to the (1) output of an eighth flip-flop 230. The output of the eighth "and" gate 228 is applied to the second input of the thirteenth "or" circuit 226 whose output is applied to the trigger terminal T of the address counter 138 of Fig. 3.

The set terminal S of the eighth flip-flop 230 is connected to the equality signal line 154 of the equality gate 150 of Fig. 3 and the reset terminal R is connected to the output of the series combination of the eighth delaying means 229 and a ninth delaying means 231.

The three-input seventh "and" gate 227 is further enabled by the (1) output of a ninth flip-flop 232 to transmit, when enabled, "advance" pulses from the predetermined counter 132 of Fig. 3, applying these pulses to the trigger terminal T of the index write counter 152 of Fig. 3. The ninth flip-flop 232 is set by the output of a two-input ninth "and" gate 233, the inputs of which are connected to the output of the fourth "or" circuit 44 of Fig. 1B and to the index pulse source. The ninth flip-flop 232 is reset by a signal from the non-equal signal line 156 of the equality gate 150 of Fig. 3.

The (1) output of the sixth flip-flop 221 is also applied to a two-input tenth "and" gate 234, the second input of which is an index pulse, *ip*, applied through the tenth delaying means 235. The (0) output of the sixth flip-flop 221 is applied also to a one-shot multivibrator 236 whose output is combined with the output of the tenth "and" gate 234 at a two-input fourteenth "or" circuit 237. The output of the fourteenth "or" circuit 237 is connected to the reset terminal R of the address counter 138 of Fig. 3.

In operation, the system may use several sorters such as have been disclosed in the above-mentioned copending Ayres and Smith and Guerber applications. Such special purpose data processing machines have information extraction routines which are designated "Extract by List." In the present invention, several such extractors or sorters may be used, operating in the "Extract by List" mode, whereby a List Input Tape contains, in order, the key words of desired messages. All of the messages are stored in the library or tapefile. The desired messages, when found, may be written on an output tape.

The earlier, above-mentioned Spielberg application describes one sorter working in the "Extract by Class" mode whereby all messages falling into the category defined by the key may be extracted. In that application, the sorter had access to several memory units or tape stations 10. As may be seen, the Extract by List mode may be considered as successive Extract by Class operations with each class criteria listed in order on a List Input Tape.

The process of interrogating the library is started by an Extract signal from the central keyboard 21 of Fig. 1A, which is applied to reset all flip-flops in the circuits of Figs. 4, 5, and 6, and to set the sixth flip-flop 221 of Fig. 8. The "advance" pulse, derived from the predetermined counter 132 of Fig. 3, is applied through the enabled "free" advance gate 177 of Fig. 4 to the address counter flip-flops 178 in the sorter address counter 176. The binary addresses of the sorters 16 are generated from the combined outputs of the address flip-flops 178. As each successive "advance" pulse is applied, a different sorter address is generated. After the Extract signal, the first advance pulse to occur sets the sorter address counter 176 to the binary address of sorter No. 1. The binary address signals are applied to the sorter address array 175 which applies a signal to one of the sorter address "and" gates 174.

The routine schedule unit 171 provides enabling levels to those sorter address "and" gates 174 associated with the sorters 16 that are to be used in the operation. It may be desirable, for instance, to exclude one or more sorters 16 from the regular interrogation operation, leaving them available for other tasks or special interrogation requests. A timing pulse TP is applied to all of the sorter address "and" gates 174. The No. 1 "and" gate 174 associated with sorter 16, No. 1, is fully enabled and the TP is passed to set the No. 1 sorter selector flip-flop 172.

The (1) output of the sorter selecting flip-flop 172 opens the sorter selecting "and" gate 160, Fig. 2, Fig. 5, permitting a flow of two types of information from the selected sorter 16 into the sorter status logic unit 200. In a preferred embodiment, twelve sorter selecting "and" gates 161 are used, seven of which provide channels of message information characters and five of which provide information indicating existing conditions within the sorter 16. Information signals provided by the sorter 16 are: First Character at register output, FCH; File Memory Tape Running, FMTR; List Input Tape Running, LITR; File Extract Tape Running, FETR; and List Equals File, LEF, if a message in the sorter register has been compared with and found equal to a message on the File Memory Tape. Each of such status signals is applied to a test circuit through an associated logic "or" circuit 201*a*—201*e* to corresponding logic flip-flops 202*a*—202*d* and the first character "and" gate 187 which register these conditions.

The *a*—*d* logic flip-flops 202*a*—202*d* are reset with each "advance" pulse from the "free" advance gate 177 applied through the selector reset "or" circuit 173 on signal line 183. Under certain conditions, as recognized in the logic unit 203, a sorter 16 may be considered "free" and, therefore, may be assigned a "task." A sorter is "busy" if (*a*) an extract tape is running, or (*b*) if a memory tape is running and either a list tape is running or the file and list criteria are not equal.

The output signal of the logic unit 203 is applied to the logic "and" gate 204, enabling it to pass a timing pulse TP which sets the "free" flip-flop 205. The free (1) signal closes the "free" advance gate 177 to further "advance" pulses from the predetermined counter 132 of Fig. 3, and is further applied to enable the address "and" gates 179, thereby transmitting the binary address of the "free" sorter 16 along multi-channel line 19 to the switching center 14.

The Extract signal sets the flip-flop 25 of Fig. 1A, the start control flip-flop 130 of Fig. 8, and the sixth flip-flop 221 of Fig. 8. The first criterion word is read into the internal register (not shown) of the addressed sorter 16. The first character of the criterion circulates to the output or "head end" of the internal register. In some sorters, the internal sorter register is not shifted by an external clock, but derives clock pulses from incoming message character signals. Unless an input tape is being read, the register does not recirculate its contents.

If the sorter is "free," and no file tape is running, special means are provided to cause recirculation of the criterion in the internal sorter register. A "circulate" signal is provided by the circulate "and" gate 186 of the gate enabling unit 185 of Fig. 6. The circulate "and" gate 186 is enabled by the free (1) signal and the *c'* output of the *c* logic flip-flop 202*c*, indicating File Memory Tape not running. Timing pulses TP are gated through the enabled circulate "and" gate 186 to provide a series of "circulate" signals through the enabled sorter selecting "and" gate 162 to the advancing oscillator of the sorter internal register (not shown).

The first character at "head end" signal is transmitted through the corresponding logic "or" gate 201*e* to the first character "and" gate 187 which is further enabled by the free (1) output of the "free" flip-flop 205. The next timing pulse, *tp*1 passes through the first character "and" gate 187 to trigger the first flip-flop 188, and the third flip-flop 195. After a delay sufficient to stabilize the output of the first flip-flop 188, the delayed *tp*1 signal is applied to the first "and" gate 191 and the second "and" gate 192 through the sixth delaying means 189.

The first "and" gate 191 is open, having been enabled by the (0) output of the second flip-flop 193, and the (1) output of the first flip-flop 188. The output of the first "and" gate 191 is applied to set the third flip-flop 195, which opens the "free" sorter gate 180. The characters circulating in the internal register of the sorter 16 are gated into shift register 42 of Fig. 1B, through the start control and shift advance control units 20, 30.

As a reference number cycles through the internal sorter register, the first character signal is again applied to the first character "and" gate 187, enabling the passage of a timing pulse *tp*1, this time triggering the first flip-flop 188 and the third flip-flop 195 into the reset state. Enabling levels are thus removed from the "free" sorter gates 180 and the first "and" gate 191. The (0) output of the first flip-flop 188 enables one input of the second "and" gate 192, which is further enabled by the (0) output of the second flip-flop 193.

The same timing pulse, *tp*1, from the sixth delaying means 189 is applied to the open second "and" gate 192, setting the second flip-flop 193, further disabling the first "and" gate 191, and, after a delay, closing the second "and" gate 192.

Subsequent alternate first character signals from the sorter 16 trigger the first flip-flop 188 to the set state, but the first "and" gate 191 remains disabled until the second flip-flop 193 is reset. The (1) output of the second flip-flop 193 opens the third "and" gate 196 to the timing pulse, *tp*2, which sets the fourth flip-flop 197. The (1) output of the fourth flip-flop 197 partially enables the advance "and" gate 34 of Fig. 1B through the advance "or" circuit 33. The advance "and" gate is fully enabled by the (1) output of a restart multivibrator 58 (not shown) within the shift stop control unit 50 which is fully described in the Spielberg application.

Timing pulses are applied to the shift register 42 from the fifth delaying means 48, through the enabled advance "and" gate 34 and the third "or" circuit 38, to circulate the reference number to the "head end." When the first character appears at the head end of the shift register 42, a signal appears at the fourth "or" circuit 44.

A stop flip-flop 54 (not shown but disclosed in the Spielberg application) in the shift stop control unit 50 of Fig. 1 is set by a timing pulse, *tp*3, through a stop "and" gate 52 (not shown) which also resets the advance flip-flop 32. An enabling level to the fourth "and" gate 199 of Fig. 6 admits *tp*1 to reset the fourth flip-flop 197. The advance "or" circuit 33 is disabled, closing the advance "and" gate 34.

As in the Spielberg application, an index pulse, *ip*, applied to the start "and" gate 26 of Fig. 1A, starts the criterion circulating through the shift register 42 in character-by-character synchronism with the characters on the drum 102. The criterion is recirculated in the shift register 42 and each time is compared to successive drum criteria. Comparisons are made in the message comparator 80 until a "Less Than" signal is produced, indicating that the criterion in the shift register 42 has a lesser binary value than the criterion currently being read from the drum 102. The "Less Than" signal is applied to the comparator "or" circuit 81.

The "Less Than" signal is applied to the tenth "or" circuit 222 of Fig. 8 to reset the start counter flip-flop 130, disabling the counter "and" gate 136. The (0) output of the start counter flip-flop 130 enables the addressing "and" gates 140, and the address of the file memory tape containing the desired message is sent to the switching center 14.

When the addressed file memory tape 10 has been signalled, the switching center 14 attempts to connect the tape to the sorter 16. If the connection is made, the sorter 16 proceeds to search the tape for the desired message. Should the particular tape be busy, the sorter 16 is disconnected from the interrogation system and repeats the search process when again addressed. The signal, File Memory Tape signalled, is applied to the free "or" circuit 206 of Fig. 5, resetting the free flip-flop 205 and the second flip-flop 193 of Fig. 6. The FMT-signalled signal is further applied to the twelfth "or" circuit 224 of Fig. 8, through the fifth "and" gate 225 and the eleventh "or" circuit 223 to set the start counter flip-flop 130. The counter "and" gate 136 is again enabled and the addressing "and" gates 140 are closed.

The (0) output of the free flip-flop 205 enables the free advance gate 177 of Fig. 4. "Advance" pulses are again provided through the selector reset "or" circuit 173 (Fig. 4) to signal line 183 for resetting the sorter selecting flip-flops 172 and the first, third and fourth flip-flops 188, 195, 197 of Fig. 6.

The sorter address counter 176 of Fig. 5 is triggered by successive "advance" pulses and the remaining sorters 16 are addressed in order. When the sorter status logic unit 203 indicates than an addressed sorter 16 is free, the "free" flip-flop 205 is set and the free advance gate 177 is closed to further "advance" pulses. The above-described cycle of placing a reference number from the input source into the system is repeated.

As each sorter 16 is addressed, its reference number is circulated into the system and, after the comparisons with the drum message, the proper file memory tape 10 is connected to the sorter 16. When all the sorters 16 are "busy," the "free" flip-flop 205 remains in the reset or (0) state and "advance" pulses are provided to reset the sorter selection flip-flops 172 and advance the sorter address counter 176. Each sorter is examined in turn until the "free" flip-flop 205 is again set by the proper output of the logic unit 203.

When a sorter 16 has found the desired message on the file memory tape 10, the sorter is considered again available, although the file tape 10 is not immediately disconnected. A new criterion is placed in the interrogation system and a tape address generated for the location of the new "desired" message. Unless the new message sought is on a different file memory tape, the search continues on the same tape. If more than one message can be found on a file memory tape, switching time is thus saved without requiring as a routine matter that every tape be searched to the end.

A different sorter 16 may be addressed with each "advance" pulse, so that the idle waiting time for any sorter 16 is rarely more than a few drum revolutions, since "busy" sorters are skipped.

Should it be necessary to rewrite the index of criteria, the Write signal is generated at the central keyboard 21 of Fig. 1A to reset the start flip-flop 25. The Write signal is applied to the counter reset "or" circuit 169 of Fig. 4 to reset the sorter address counter 176, and through the selector reset "or" circuit 173 to signal line 183 which resets the sorter selector flip-flops 172 of Fig. 4, the *a—d* logic flip-flops **202*a*—202*d*, and the "free" flip-flop 205 of Fig. 5, and the flip-flops of the gate enabling unit 185 of Fig. 6. The Write signal also resets the sixth flip-flop 221 and the start counter flip-flop 130 of Fig. 8. The (0) output of the sixth flip-flop 221 is applied to a one-shot 236 which generates a resetting pulse for the address counter 138** of Fig. 3.

The free advance "and" gate 177 of Fig. 4 is open to "advance" pulses from the predetermined counter 132. As above, the sorter address counter 176 is triggered by each "advance" pulse. The one sorter 16 selected to write the index has its associated sorter address "and" gate 174 partially enabled by a signal from the routine schedule unit 171. With each "advance" pulse, the sorter address counter 176 successively applies an enabling level to one input of the different sorter address "and" gates 174 through the sorter address array 175. When the selected sorter 16 is addressed, the sorter address "and" gate 174 is fully enabled passing a timing pulse TP, to set the corresponding sorter selector flip-flop 172.

As above, the sorter selector flip-flop 172 provides an enabling level to the sorter selector "and" gates 160 of Fig. 5 and status information is transmitted through the logic "or" circuit **201*a*—201*d*** into the *a—d* logic flip-flops **202*a*—202*d*. The logic block circuit 203 provides an output indicative of a "free" sorter. The next occurring timing pulse, TP, is passed by the logic "and" gate 204 to set the "free" flip-flop 205, inhibiting further "advance" pulses. The (1) output of the "free" flip-flop 205 opens the address "and" gates 179 of Fig. 4 and the coded address of the selected sorter 16 is transmitted to the switching center 14 on multiple channel adress line 19**.

The index write counter 152 of Fig. 3 is reset to a zero count by each index pulse, *ip*, and the reference address counter 138 is reset by the output of the one-shot 236 of Fig. 8. The equality gate 150 of Fig. 3 provides a signal on the equality line 154 when the two counters have equal counts. The equality signal sets the eighth flip-flop 230 of Fig. 8, partially enabling the eighth "and" gate 228, which has been partially enabled by the (0) output of the sixth flip-flop 221.

The next index pulse, *ip*, through the eighth delaying means 229 is applied through the open eighth "and" gate 228 and the thirteenth "or" circuit 226 to trigger the address counter 138 to a count of 0001. The output of the eighth "and" gate 228 is also applied through the comparator "or" circuit 81 of Fig. 1 to the shift stop control unit 50 where an enabling level is generated for the start "and" gate 26.

The same index pulse, *ip*, passing through the ninth delaying means 231 resets the eighth flip-flop 230, closing the eighth "and" gate 228 to further index pulses. The equality gate 150 provides an non-equal signal on line 156, resetting the ninth flip-flop 232. The non-equal signal also resets the fifth flip-flop 212 of Fig. 7.

The (0) output of the start counter flip-flop 130 opens the addressing "and" gates 140 of Fig. 1, providing the address of the first tape station 10 to the switching center 14. The first tape station 10 is connected to the sorter 16 and the criterion of the first message is circulated into the sorter internal register and is applied to the recognition gate 23 of Fig. 1A.

The criterion of the first message passes through the free sorter gate 180 into the shift register 42 as above and is circulated to a "head end" position. When the first character is at "head end," the fourth "or" circuit 44 of Fig. 1B applies an enabling signal to the shift stop control unit 50 of Fig. 1 and the ninth "and" gate 233 of Fig. 8. The start "and" gate 26 and the advance "and" gate 34 are partially enabled by a signal from the shift stop control 50. An index pulse, *ip*, sets the ninth flip-flop 232, partially enabling the seventh "and" gate 227 which is also enabled by the sixth flip-flop 221 (0) output. The advance flip-flop 32 is set and the advance "and" gate 34 is opened. Timing pulses from the fifth delaying means 48 are then gated through to the shift register 42 shift terminal and the criterion is circulated in the shift register 42. The first "advance" pulse of the drum cycle passes, triggering the index write counter 152 of Fig. 3 to 0001 which, when applied to the equality gate 150, produces a signal on the equality line 154.

The word space on the drum 102 immediately following the index mark is left blank and is considered the zero tape station position. When the index write counter 152 is advanced to 0001 by the first "advance" pulse through the seventh "and" gate 227, the equality signal on the signal line 154 sets the fifth flip-flop 212 of Fig. 7, and opens the write "and" gates 211 which are partially energized by an enabling level from the (0) output of the start flip-flop 25 of Fig. 1A. The stored criterion, circulating again, is clocked out of the shift register 42 through the enabled write "and" gates and is written on the drum 102 in the first tape station position, but the second word space.

The second "advance" pulse is transmitted through the seventh "and" gate 229 of Fig. 8 to advance the index write counter 152 of Fig. 3 to a count of 0010. A non-equal signal is produced on the signal line 156, resetting the fifth flip-flop 212 of Fig. 7, thereby closing the write "and" gates 211.

At the completion of the drum revolution, the index pulse, *ip*, passes through the open eighth "and" gate 228 to advance the address counter 138 of Fig. 3 to the next count, 0010. Every index pulse resets the index writer counter 152 and also the eighth flip-flop 230, preventing extraneous triggering impulses to the address counter 138.

The next reference address is transmitted through the open addressing "and" gates 140 to the switching center 14 and the second tape station 10 is connected to the sorter 16. The second criterion is placed in the shift register 42 as described above. At the occurrence of a character signal at the fourth "or" circuit 44, the ninth "and" gate 233 is enabled, passing the next index pulse, *ip*, to set the ninth flip-flop 232, which enables the seventh "and" gate 227.

At the first "advance" pulse of the cycle, the index write counter 152 is advanced to 0001. At the second advance pulse, the count is advanced to 0010 at which time an equality signal again appears on the equality line 164. The write "and" gates 211 are again opened and second criterion is then gated onto the drum 102 in the second tape station position, the third word space.

This process is repeated until the entire new index, consisting of the first message criterion of each reference tape, is written on the drum 102.

Advance pulses trigger the index write counter 152 only if there are characters in the shift register 42 ready to be written, as indicated by a signal at the fourth "or" circuit 44. When the count of the index write counter 152 is equal to the count of the address counter 138, the criterion in the shift register 42 is written in the proper location on the drum 102.

It may be seen that in the extract mode, the address counter 138 always records a count after a criterion has been compared, which count corresponds to a particular tape station 10. Should the message comparator 80 output change from a "Greater Than or Equal To" to a "Less Than" signal during a comparison, the start counter flip-flop 130 is reset closing the counter "and" gate 136 thus preventing further counting in the address counter 138. The desired message is to be found in the tape station 10 whose first message criterion is greater, and whose last message criterion is less than the desired criterion. The number of that tape station 10 is recorded in the address counter 138 and that address is transmitted through the addressing "and" gates 140 to the switching center 14.

Provision may be made to rewrite one index criterion only. The address of the altered tape station is set on the address counter 138 by means of a "generate-one-address" input shown in Fig. 3. The correct criterion is placed in the shift register 42. At the proper count of the index write counter 152, indicating the proper message location on the drum 102, the new criterion is written into that proper drum location.

Thus, there has been disclosed a novel and improved method for rapid interrogation of an "electronic Library System" using several sorters with a provision for rewriting the index in the magnetic drum. As may be seen, any number of sorters may be combined within the system. The number of tape stations in the library that can be indexed may be varied and is limited only by the total capacity of the cyclical storage device and the length of the individual message criteria.

What is claimed is:

1. The combination with a first storage means and a plurality of data processing machines each having an internal storage means, of a means to interrogate said first storage means comprising a test circuit, selecting means for connecting each of said data processing machines in turn to said test circuit, said selecting means being inhibited by a free signal from said test circuit indicating connection of said test circuit to an available data processing machine, and a gate means responsive to said free signal to connect the said available data processing machine to said first storage means, said free signal enabling the input of said available data processing machine.

2. The combination with a first storage means and a plurality fo data processing machines, of a means to interrogate said first storage means comprising counting means, a test circuit, a comparator, selecting means responsive to said counting means to connect each of said data processing machines in turn to said test circuit, said counting means being inhibited by a free signal from said test circuit indicating connection of said test circuit to a free data processing machine, and a gate means responsive to said free signal to connect the said free data processing machine to said comparator, said first storage means also being connected to said comparator.

3. The combination with a first storage means and a plurality of data processing machines each having internal storage means and each being adapted to be connected to a second storage means, of means to interrogate said first storage means comprising counting means, a test circuit, a comparator, selecting means responsive to said counting means to connect each of said data processing machines in turn to said test circuit, said counting means being inhibited by a free signal from said test circuit indicating connection of said test circuit to a free data processing machine, and a gate means responsive to said free signal to connect the said free data processing machine to said comparator, said test circuit providing a busy signal indicating that said test circuit is connected, to a data processing machine connected with and in operation with said second storage means, said counting means being enabled and said gate means being disabled by said busy signal from said test circuit, said first storage means being connected to said comparator.

4. The combination with a signal storage device and a plurality of data processing machines each providing status output signals and information output signals and each being connected to receive input information signals, of an interrogation means for connecting one of said data processing machines to said signal storage device comprising a plurality of first gating means each connected to said outputs of a separate data processing machine, counting means, selector means responsive to said counting means for selectively enabling one of said first gating means, a test circuit connected to said first gating means and responsive to said status output signals to provide "busy" and "free" signals, count inhibiting means connected to said counting means and responsive to said "free" signals for inhibiting said counting means, and second gating means connected to said first gating means and responsive to said "free" signals to transmit said information output signals to said signal storage device.

5. The combination with a plurality of data processing machines, a first storage means and a second storage means, of a means to interrogate said first storage means comprising counting means, a test circuit, a comparator, selecting means responsive to said counting means to connect each of said data processing machines in turn to said test circuit, said counting means being inhibited by a free signal from said test circuit indicating connection of said test circuit to a free data processing machine, and a gate means responsive to said free signal to connect the said free data processing machine to said comparator, said test circuit providing a busy signal when a selected data processing machine is connected with and in operation with said second storage means, said counting means being enabled and said gate means being disabled by lack of said free signal from said test circuit, said first storage means being connected to said compartor.

6. The combination with a first storage means, a plurality of second storage means, and a plurality of data processing machines each adapted to be connected to ones of said second storage means, of a means to interrogate said first storage means comprising counting means, a test circuit, selecting means responsive to said counting means to connect each of said data processing machines in turn to said test circuit, said counting means being enabled by a busy signal from said test circuit indicating seletion of a data processing machine connected with and in operation with one of said second storage means, a comparator, a gate means connecting said data processing machines, in turn, to said comparator, said gate means being inhibited by lack of said free signals, said first storage means being connected to said comparator, and a switching network responsive to the output of said comparator for connecting ones of said plurality of second storage means to the input of the data processing machine connected to said comparator.

7. The combination with a signal storage device and a plurality of data processing machines each providing status output signals and information output signals and each being connected to receive input information signals, of an interrogating means for connecting one of said data processing machines to said signal storage device comprising a plurality of first gating means each connected to the said outputs of a separate data processing machine, counting means, selector means responsive to said counting means for selectively enabling one of said first gating means, a test circuit connected to said first gating means and responsive to said status output signals to provide "busy" and "free" signals, count inhibiting means connected to said counting means and responsive to said "free" signals for inhibiting said counting means, a comparator, and second gating means connected to said first gating means, said "free" signals enabling said second gating means to transmit said information output signals to said comparator, said signal storage device being connected to said comparator, said "free" signal also enabling the input of said one of said data processing machines to receive said input information signals.

8. An interrogation system comprising a plurality of data processing machines, a circulating memory, a plurality of first gating means each connected to a different data processing machine, counting means for successively enabling each of each first gating means, a test circuit connected to all of said first gating means and responsive to signals from the enabled one of said first gating means to provide "free" and "busy" signals corresponding to internal operation signals of the connected data processing machine, second gating means connecting said first gating means to said circulating memory and being enabled by said "free" signals, said counting means being responsive to said test circuit signals, being enabled by said "busy" signals and disabled by said "free" signals.

9. In combination with a data storage system having a plurality of storage devices, a data processing machine, and a circulating serial storage device, a means to write an index of said data storage system into said circulating serial storage device comprising means to connect said data processing machine to each of said data storage devices, buffer storage means connected to said data processing machine to store indicia words to be written into said circulating serial storage device, a first counting means for counting said indicia words transferred from said buffer storage to said circulating serial storage device, second counting means for counting character positions in said circulating serial storage device relative to a reference position, comparing means to compare counts registered on said first and second counting means, and gating means, responsive to said comparing means, connecting said buffer storage and said circulating storage to enable the writing of the contents of said buffer storage means into said circulating storage means after counts recorded are equal.

References Cited in the file of this patent

UNITED STATES PATENTS

| | | |
|---|---|---|
| 2,667,533 | Zenner | Jan. 26, 1954 |
| 2,798,216 | Goldberg | July 2, 1957 |

UNITED STATES PATENT OFFICE

CERTIFICATE OF CORRECTION

Patent No. 2,951,234 August 30, 1960

Arnold M. Spielberg et al.

It is hereby certified that error appears in the printed specification of the above numbered patent requiring correction and that the said Letters Patent should read as corrected below.

Column 6, line 58, for "and" read -- an --; column 8, line 21, for "the 'free" flip-flop" read -- the "free" flip-flop --; column 13, line 71, for "adress" read -- address --; column 14, line 70, for "writer" read -- write --; column 15, line 11, for "164" read -- 154 --; line 71, for "fo" read -- of --; column 16, line 60, for "compartor" read -- comparator --; line 70, for "seletion" read -- selection --.

Signed and sealed this 11th day of April 1961.

(SEAL)
Attest:

ERNEST W. SWIDER

Attesting Officer

ARTHUR W. CROCKER

Acting Commissioner of Patents